(12) United States Patent
Lim et al.

(10) Patent No.: US 9,300,519 B2
(45) Date of Patent: *Mar. 29, 2016

(54) METHOD AND APPARATUS FOR INTERWORKING VOICE AND MULTIMEDIA SERVICES BETWEEN CSI TERMINAL AND IMS TERMINAL

(71) Applicant: Samsung Electronics Co., Ltd., Suwon-si, Gyeonggi-do (KR)

(72) Inventors: Han-Na Lim, Siheung-si (KR); Osok Song, Suwon-si (KR); Sung-Ho Choi, Suwon-si (KR); Eun-Hui Bae, Seoul (KR); Tae-Sun Yeoum, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

This patent is subject to a terminal disclaimer.

(21) Appl. No.: 13/690,715

(22) Filed: Nov. 30, 2012

(65) Prior Publication Data

US 2013/0094494 A1    Apr. 18, 2013

Related U.S. Application Data

(63) Continuation of application No. 11/496,712, filed on Aug. 1, 2006, now Pat. No. 8,325,708.

(30) Foreign Application Priority Data

Aug. 1, 2005 (KR) .................. 10-2005-0070449
Jan. 11, 2006 (KR) .................. 10-2006-0003335
Apr. 28, 2006 (KR) .................. 10-2006-0038753

(51) Int. Cl.
*H04L 29/06* (2006.01)
*H04W 76/02* (2009.01)
(Continued)

(52) U.S. Cl.
CPC ...... *H04L 29/06027* (2013.01); *H04L 65/1069* (2013.01); *H04W 76/025* (2013.01); *H04L 65/1016* (2013.01); *H04W 88/14* (2013.01); *H04W 92/02* (2013.01)

(58) Field of Classification Search
USPC ........................................ 370/352, 354, 331
See application file for complete search history.

(56) References Cited

U.S. PATENT DOCUMENTS 4,872,160 A   10/1989   Hemmady et al.
5,740,231 A   4/1998    Cohn et al.
(Continued)

FOREIGN PATENT DOCUMENTS

JP   2004-511131   4/2004
JP   2004-147137   5/2004
(Continued)

OTHER PUBLICATIONS

3GPP TS 23.279 3rd Generation Partnership Project (Release 7), 2006.*

(Continued)

*Primary Examiner* — Dang Ton
*Assistant Examiner* — Pamit Kaur
(74) *Attorney, Agent, or Firm* — Jefferson IP Law, LLP

(57) ABSTRACT

A method and apparatus is provided for communication between a first terminal capable of using both a Circuit Switched (CS) call and an Internet Protocol Multimedia Subsystem (IMS) session, and a second terminal capable of using the IMS session, in a communication system supporting a Combined CS call and IMS session (CSI service). If the second terminal sends a Session Initiation Protocol (SIP) request (INVITE) message to originate a voice service or a multimedia service including the voice service with the first terminal, a CSI Application Server (AS) of an IMS domain managing the first terminal separates a voice service-related component included in the request message from a multimedia service-related component, and generates and sends first and second request messages to the first terminal. Upon receipt of first and second response messages corresponding to the first and second request messages from the first terminal, the CSI AS generates a combined response message and sends the combined response message to the second terminal.

12 Claims, 13 Drawing Sheets

(51) Int. Cl.
*H04W 88/14* (2009.01)
*H04W 92/02* (2009.01)

(56) References Cited

U.S. PATENT DOCUMENTS

| | | | |
|---|---|---|---|
| 6,829,227 B1* | 12/2004 | Pitt et al. | 370/329 |
| 7,359,373 B2 | 4/2008 | Kuusinen et al. | |
| 7,394,795 B2 | 7/2008 | Chitrapu et al. | |
| 7,443,834 B1 | 10/2008 | Sylvain | |
| 7,636,350 B1 | 12/2009 | Winner et al. | |
| 7,698,435 B1 | 4/2010 | Paterik et al. | |
| 7,961,714 B1* | 6/2011 | Watson | H04L 12/66 370/352 |
| 2004/0028037 A1 | 2/2004 | Rasanen et al. | |
| 2004/0029615 A1 | 2/2004 | Gerry et al. | |
| 2004/0058688 A1 | 3/2004 | Silver et al. | |
| 2004/0249887 A1 | 12/2004 | Garcia-Martin et al. | |
| 2004/0258049 A1 | 12/2004 | Sylvain et al. | |
| 2005/0153686 A1 | 7/2005 | Kall et al. | |
| 2005/0195762 A1 | 9/2005 | Longoni et al. | |
| 2006/0083199 A1 | 4/2006 | Yang | |
| 2007/0058789 A1 | 3/2007 | Lim et al. | |

FOREIGN PATENT DOCUMENTS

| | | |
|---|---|---|
| WO | WO 02/28014 A2 | 4/2002 |
| WO | WO 02/28014 A3 | 4/2002 |
| WO | WO 2004/073279 A1 | 8/2004 |
| WO | WO 2005/011207 A1 | 2/2005 |
| WO | WO 2005/029809 A1 | 3/2005 |
| WO | WO 2005/039132 A1 | 4/2005 |
| WO | WO 2006/052176 A1 | 5/2006 |

OTHER PUBLICATIONS

3GPP, GSM, "3rd Generation Partnership Project; Technical Specification Group Services and System Aspects; Combining Circuit Switched (CS) and IP Mulitmedia Subsystem (IMS) Services; Stage 2 (Release 8)", Jun. 2007, pp. 1-35, 3GPP TS 23.279 V8.0.0., Valbonne, France.

3GPP, Samsung, Motorola, Nokia, Ericsson and Huawei, "General Architecture for CSI Interworking", Feb. 2006, pp. 1-3, 3GPP TSG SA WG2 #51, Denver, CO, U.S.A.

3GPP, GSM, "3rd Generation Partnership Project; Technical Specification Group Services and Systems Aspects; Combined CS Calls and IMS Sessions; Stage 1 (Release 7)", Jul. 2005, pp. 1-14, 3GPP TS 22.279 V2.0.0, Valbonne, France.

3GPP, GSM, "3rd Generation Partnership Project; Technical Specification Group Services and System Aspects; Report on Alternative Architectures for Combining CS Bearers With IMS (Release 6)", Jun. 2005, pp. 1-55, 3GPP TR 23.899 V1.2.0., Valbonne, France.

3GPP, GSM, "3rd Generation Partnership Project; Technical Specification Group Services and System Aspects; Combining CS and IMS Services; Stage 2 (Release 7)", Apr. 2005, pp. 1-23, 3GPP TS 23.279 V1.1.0., Valbonne, France.

3GPP, GSM, "3rd Generation Partnership Project; Technical Specification Group Services and System Aspects; Report on Alternative Architectures for Combining CS Bearers With IMS (Release 6)", Dec. 2004, pp. 1-52, 3GPP TR 23.899 V1.0.0., Valbonne, France.

* cited by examiner

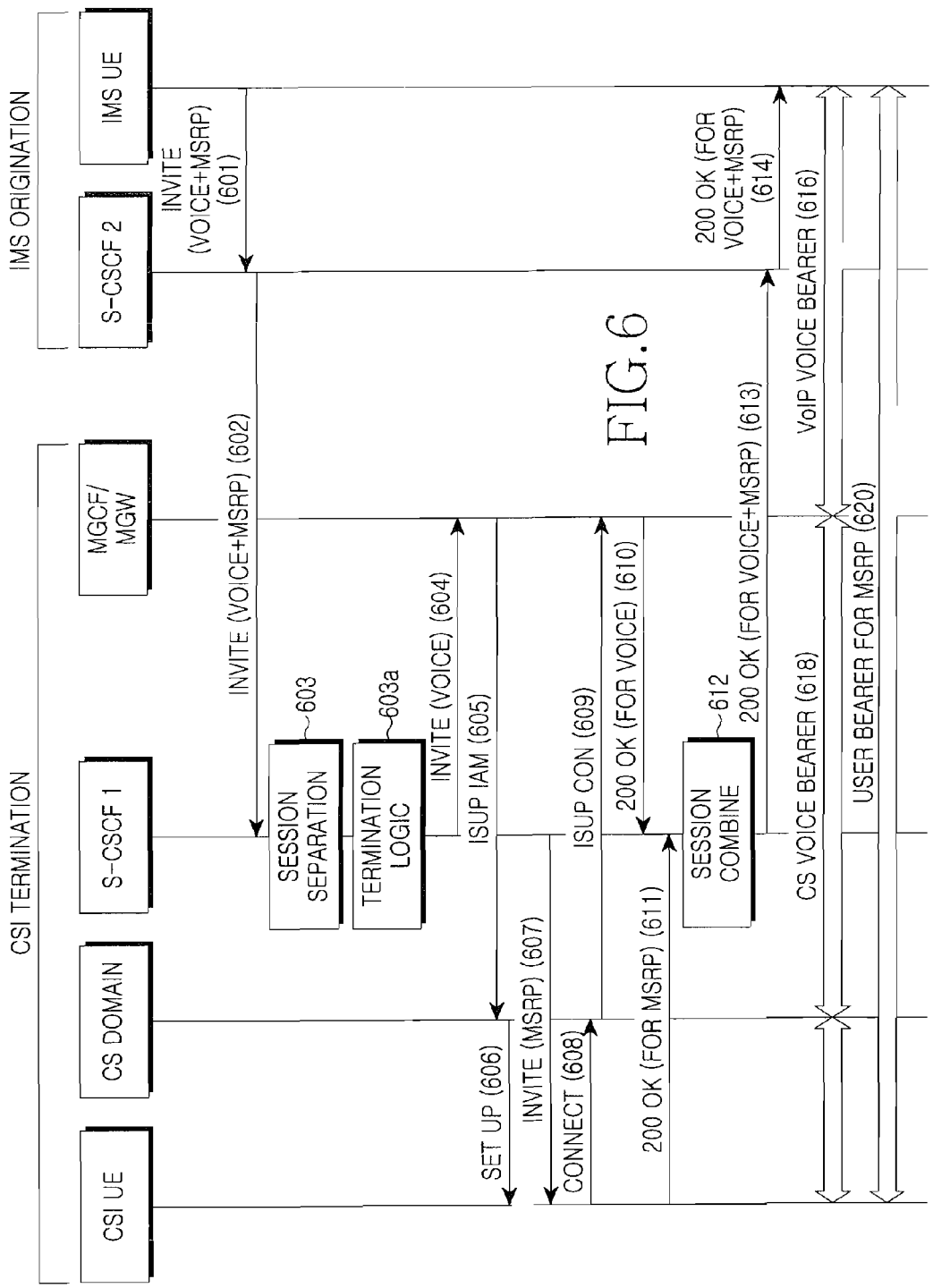

METHOD AND APPARATUS FOR INTERWORKING VOICE AND MULTIMEDIA SERVICES BETWEEN CSI TERMINAL AND IMS TERMINAL

CROSS-REFERENCE TO RELATED APPLICATIONS

This is a continuation application of U.S. application Ser. No. 11/496,712, filed Aug. 1, 2006, now U.S. Pat. No. 8,325, 708, entitled "Method and Apparatus for Interworking Voice and Multimedia Services between CSI Terminal and IMS Terminal", which claims the benefit under 35 U.S.C. §119(a) of Korean Patent Application No. 10-2005-0070449, entitled "Method and Apparatus for Interworking Voice and Multimedia Services between CSI Terminal and IMS Terminal", filed in the Korean Intellectual Property Office on Aug. 1, 2005, Korean Patent Application No. 10-2006-0003335, entitled "Method and Apparatus for Interworking Voice and Multimedia Services between CSI Terminal and IMS Terminal", filed in the Korean Intellectual Property Office on Jan. 11, 2006, and Korean Patent Application No. 10-2006-0038753, entitled "Method and Apparatus for Interworking Voice and Multimedia Services between CSI Terminal and IMS Terminal", filed in the Korean Intellectual Property Office on Apr. 28, 2006, the entire disclosures of all of said U.S. and Korean Applications are hereby incorporated by reference.

BACKGROUND OF THE INVENTION

1. Field of the Invention

The present invention relates generally to the interworking of Combined Circuit Switched (CS) call and Internet Protocol Multimedia Subsystem (IMS) session (hereinafter referred to as "CSI") service. In particular, the present invention relates to a communication method and apparatus between a terminal supporting both a CS call and an IMS session (hereinafter referred to as a "CSI terminal") and a terminal using an IMS session for real-time voice or video call (hereinafter referred to as an "IMS terminal").

2. Description of the Related Art

A CS scheme, used for the typical voice service and real-time service, refers to a scheme for forming a CS-based fixed call route between one user and another user. The IMS increases transmission efficiency and guarantees stability using a Packet Switched (PS)-based unfixed call route based on Internet Protocol (IP), and is therefore, suitable for a data service, a messaging service, and a file transfer service. The IMS can support not only the simple point-to-point call, but also a connection in which a plurality of users participate. In the CS scheme, transmission of message and user traffic is achieved through a CS call, and in the IMS, transmission of message and user traffic is achieved through an IMS session.

A service for enabling a terminal to use both the CS call and the IMS session is called 'CSI service', and the CSI service uses the CS call especially for voice transmission, and at the same time, uses the IMS session for an improved PS service, for example, the messaging or file transfer service. A terminal (or User Equipment (UE)) supporting the CSI service is called a 'CSI terminal (or CSI UE)'. The CSI UE uses the CS call for a real-time voice call, and at the same time, can use the IMS session for a non-real-time PS service such as the messaging service. The CSI service, though it considers a voice call as a service using the CS call, can enable the user to use the CS call not only for the voice call, but also for the video call when a CS network supports the video call.

Hereinafter, background of embodiments of the present invention will be described with reference to a voice call service as a typical example of the service using the CS call, and to a messaging service using Message Session Relay Protocol (MSRP) as a typical example of the PS service using IMS, for convenience of description.

FIG. 1 is a diagram schematically illustrating the architecture of a mobile communication network supporting CSI service. Herein, the drawing shows the architecture of a Universal Mobile Telecommunication Service (UMTS) mobile communication network based on Global System for Mobile Communications (GSM) and General Packet Radio Services (GPRS).

Referring to FIG. 1, the mobile communication network supporting CSI service includes a Radio Access Network (RAN) 104 and a Core Network (CN) 106. The RAN 104 enables a User Equipment (UE) 102 to access the CN 106. A structure of the RAN 104 is well known to those skilled in the art according to the wireless access technology used, so a detailed description thereof will be omitted herein.

The CN 106 includes a CS domain 114, a PS domain 108, and an IMS domain 122. The CS domain 114 is comprised of entities supporting the CS call, and the entities typically include a Mobile Switching Center (MSC) 120 and Media Gateways (MGWs) 116 and 118. The MSC 120 processes the signals originating/terminating in a mobile base station in the RAN 104, and takes charge of a central control function of controlling the mobile base station such that it can efficiently operate. The MGWs 116 and 118 are gateways supporting bearer traffics and control traffics.

The PS domain 108 supports a packet-based service, and includes such nodes as a Serving GPRS Support Node (SGSN) 110 and a Gateway GPRS Support Node (GGSN) 112. The SGSN 110 manages information on the location of each UE, and performs security-related functions and access control. The GGSN 112 is an element of a GPRS network serving as a wireless gateway between the SGSN 110 and an external network 130 such as a Packet Data Network (PDN), and the UE 102 can access the external network 130 via the GGSN 112.

The IMS domain 122 is comprised of entities supporting an IMS session. The entities include a Serving-Call Session Control Function (S-CSCF) 124, an Application Server (AS) 126, and a Media Gateway Control Function/Media Gateway (MGCF/MGW) 128. The S-CSCF 124 serves to set up an IMS session and handle a Session Initiation Protocol (SIP) message delivered from the UE 102. To provide a service at the request of the UE 102, the S-CSCF 124 delivers an SIP message to other entities in the IMS domain 122, completing the session. The AS 126 is an entity for providing various applications to the user, like E-mail or Push To Talk over Cellular (PoC). The MGCF/MGW 128 is a network entity for enabling communication between an IMS user and a CS user, and includes an MGCF, which is a gateway for managing signaling translation for interworking between an IMS network and a legacy network, for example, Public Switched Telephone Network (PSTN) or the CS domain 114, and an IMS-MGW for media conversion. Although not illustrated, the IMS domain 122 can further include a Breakout Gateway Control Function (BGCF), which is a network entity for selecting the optimal MGCF which is a contact connected to the CS domain 114 taking into account routing optimization for a CS termination call. The BGCF can be included in the MGCF/MGW 128, or can be separately provided, and is a network entity for selecting the MGCF which is the contact connected to the CS network.

Aside from the foregoing entities, several other entities may exist in each domain, and the entities of each domain may participate for the CSI service.

FIG. 2 is a diagram illustrating connection architecture for control signaling between CSI UEs according to the typical CSI service.

Referring to FIG. 2, a CSI UE#1 204 and a CSI UE#2 214 are illustrated accessing a network#1 202 and a network#2 212, respectively. The network#1 202 is comprised of a CS domain#1 208, a PS domain#1 206, and an IMS domain#1 210. The network#2 212 is comprised of a CS domain#2 218, a PS domain#2 216, and an IMS domain#2 220.

A control signal 232 of a CS call for voice communication between the CSI UE#1 204 and the CSI UE#2 214 is delivered via the CS domain#1 208 and the CS domain#2 218. In addition, control messages 230 of an IMS session for the other multimedia service, except for the voice communication, are delivered via the PS domain#1 206, the IMS domain#1 210, the IMS domain#2 220, and the PS domain#2 216. The IMS session control can be performed with an SIP protocol. SIP is a protocol developed as an alternative to H.323 by Internet Engineering Task Force (IETF) Multiparty Multimedia Session Control (MMUSIC) Working Group. SIP has a platform for setting up voice and multimedia calls via an IP network.

In this way, if two UEs in communication are both CSI UEs, control flow is achieved for each individual domain. However, if one UE does not support CSI service, for example, uses only the IMS session, it cannot follow the above control flow.

Accordingly, a need exists for a system and method for providing communication between a UE supporting the CSI service and a UE not supporting CSI service or a UE using only the IMS session.

SUMMARY OF THE INVENTION

Embodiments of the present invention are provided to address the above and other problems, and provide a control message exchange method and apparatus for performing a voice service and other multimedia service between a UE capable of supporting both a CS call and an IMS session (hereinafter referred to as a "CSI UE") and a UE not supporting the CS call or preferring to use the IMS session for a real-time service, even though it supports the CS call (hereinafter referred to as an "IMS UE").

Exemplary embodiments of the present invention provide a method and apparatus for providing a voice service or a multimedia service including the voice service to a CSI UE when an IMS UE originates a call.

According to one aspect of exemplary embodiments of the present invention, a method is provided for interworking voice and multimedia services between a first terminal capable of using both a Circuit Switched (CS) call and an Internet Protocol Multimedia Subsystem (IMS) session, and a second terminal capable of using the IMS session. The method comprises the steps of receiving, by a control entity of an IMS domain in which the first terminal is registered, a Session Initiation Protocol (SIP)-based request message targeting the first terminal, associated with a service originated by the second terminal and if the request message requests both a voice call service and a multimedia service other than the voice call service, separating, by the control entity, a voice call-related component included in the request message from a multimedia service-related component, and generating first and second request messages each including an associated one of the components. The method may further comprise the steps of sending the first request message including the voice call-related component from the control entity to the first terminal via a CS domain to which the first terminal is connected, sending the second request message including the multimedia service-related component from the control entity to the first terminal, receiving, by the control entity, first and second response messages corresponding to the first and second request messages from the first terminal, and generating a combined response message by combining the first and second response messages. The method may further comprise the steps of sending the combined response message to the second terminal in response to the request message and performing a voice call through a voice bearer set up between the second terminal and a media gateway (MGW) of the IMS domain and a CS voice bearer set up between the first terminal and the CS domain, and simultaneously performing the multimedia service through a user bearer set up between the second terminal and the first terminal, all of the bearers being set up through the above steps.

According to another aspect of exemplary embodiments of the present invention, an apparatus is provided for interworking voice and multimedia services. The apparatus comprises a first terminal capable of using a Circuit Switched (CS) call for a voice call and using both the CS call and an Internet Protocol Multimedia Subsystem (IMS) session for a Packet Switched (PS) service, a second terminal using the IMS session for both the voice call and the PS service, and a control entity of an IMS domain managing the first terminal for receiving a Session Initiation Protocol (SIP)-based request message targeting the first terminal, generated by the second terminal, generating first and second request messages including a voice call-related component and a multimedia service-related component of the request message, respectively, sending the first request message to the first terminal via a CS domain to which the first terminal is connected, and sending the second request message to the first terminal. The control entity may comprise a means for receiving first and second response messages corresponding to the first and second request messages from the first terminal, generating a combined response message by combining the first and second response messages, and sending the combined response message to the second terminal in response to the request message, and performing a voice call through a voice bearer set up between the second terminal and a media gateway (MGW) of the IMS domain and a CS voice bearer set up between the first terminal and the CS domain, and simultaneously performing the multimedia service through a user bearer set up between the second terminal and the first terminal, all of the bearers being set up through an operation of the control entity.

BRIEF DESCRIPTION OF THE DRAWINGS

The above and other objects, features and advantages of exemplary embodiments of the present invention will become more apparent from the following detailed description when taken in conjunction with the accompanying drawings, in which:

FIG. 6 is a diagram illustrating a control signal flow for originating a combined service of voice and MSRP by an IMS UE when an S-CSCF serves as a control entity according to the first exemplary embodiment of the present invention;

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Exemplary embodiments of the present invention provide communication between a CSI UE, capable of using only a CS call for a voice call and at the same time using an IMS session for other multimedia service, and an IMS UE not supporting the CS call or preferring to use the IMS session for the voice call or the other multimedia service. In particular, a description will be made of a communication performed when an IMS UE originates a multimedia service including a voice service, and the multimedia service terminates at a CSI UE.

Hereinafter, exemplary embodiments of the present invention will be described with reference to a voice call service as a typical example of the service using the CS call, and to a messaging service using Message Session Relay Protocol (MSRP) as a typical example of the PS service using IMS, for convenience of description.

Exemplary embodiments of the present invention propose a control structure for exchanging control signals for a voice service and other multimedia service when a CSI UE and an IMS UE communicate with each other. In addition, exemplary embodiments of the present invention propose a control signaling scheme for providing a voice service or a multimedia service including the voice service (hereinafter referred to as a "combined service") to a CSI UE when an IMS UE originates a call in the above control structure.

Specifically, an exemplary embodiment of the present invention proposes to allow a control entity in an IMS domain of a CSI UE to manage control signals. When an IMS UE attempts a voice call to a CSI UE, the control entity appropriately modifies an SIP message sent by the IMS UE, and delivers the modified SIP message to a CS domain of the CSI UE. In this manner, the voice call is achieved using the CS domain. In addition, when the IMS UE sends an SIP message for simultaneously using the voice call and the multimedia service to the CSI UE, the control entity delivers a media component related to the voice service in the SIP message to the CS domain, and delivers a media component related to other multimedia service to the CSI UE via the IMS domain. That is, the control entity individually handles control messages of the IMS session wherein the voice call and other multimedia service are combined.

Figure 3:
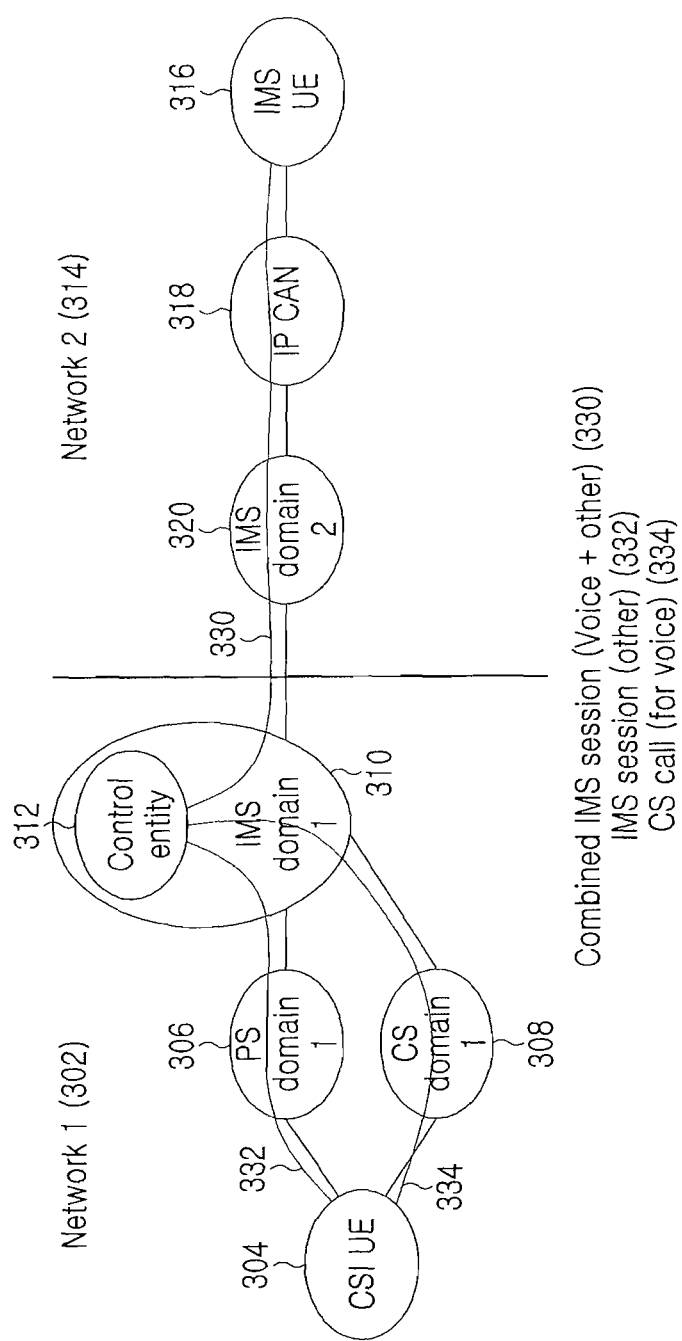
FIG. 3 is a diagram illustrating a connection configuration of a control signal between a CSI UE and an IMS UE according to an exemplary embodiment of the present invention.

FIG. 3 is a diagram illustrating a connection configuration of a control signal between a CSI UE and an IMS UE according to an exemplary embodiment of the present invention.

As illustrated in FIG. 3, a network#1 302 where a CSI UE 304 is located, is comprised of a CS domain#1 308, a PS domain#1 306, and an IMS domain#1 310. A network#2 314 where an IMS UE 316 is located, is comprised of an IMS domain#2 320 and an IP-Connectivity Access Network (IP-CAN) 318. The IP-CAN 318 is an intermediate network supporting an IMS subscriber such that it can access the PS domain or the IMS domain.

Figure 1:
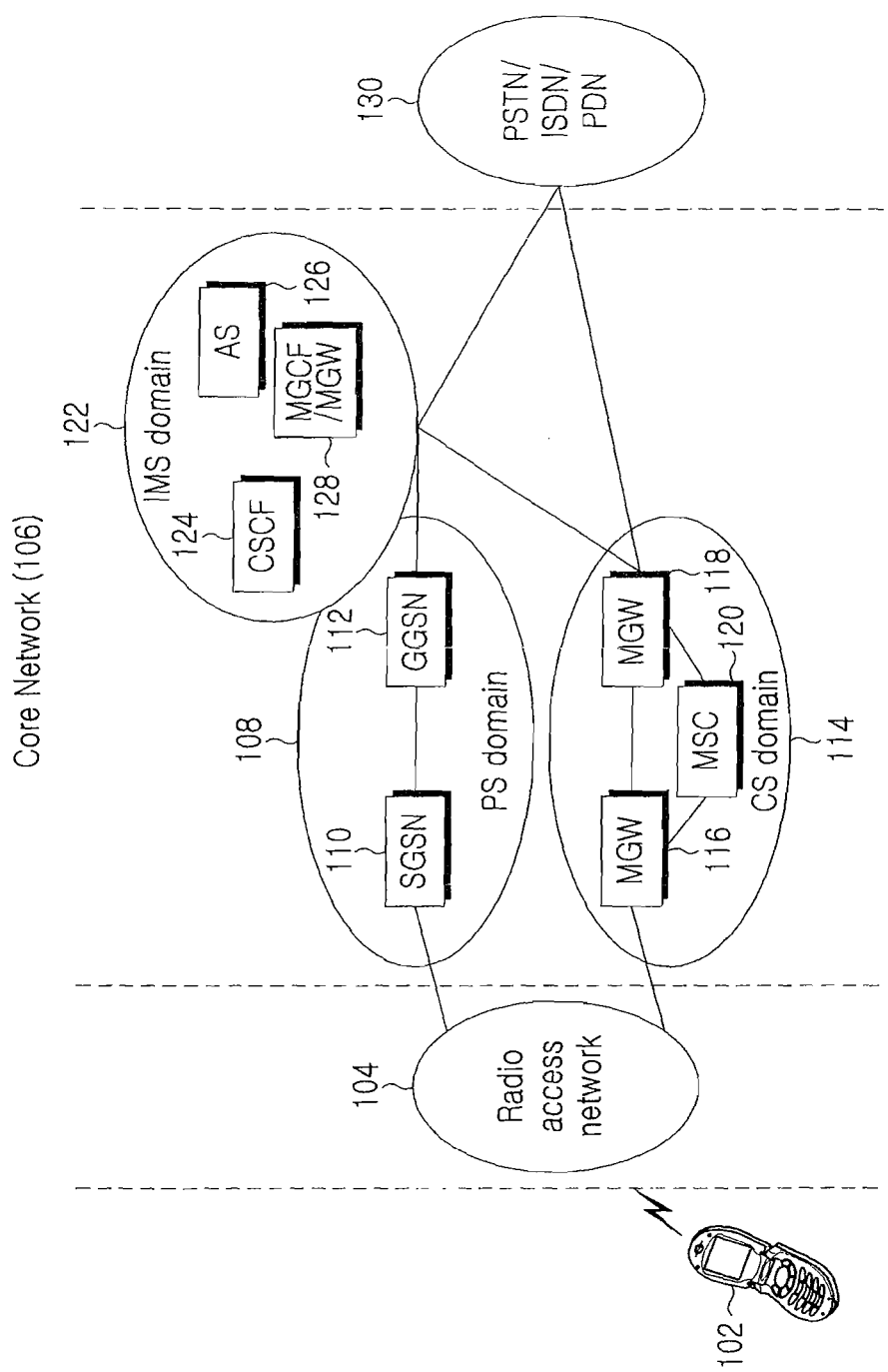
FIG. 1 is a diagram schematically illustrating the architecture of a mobile communication network supporting CSI service.
Figure 2:
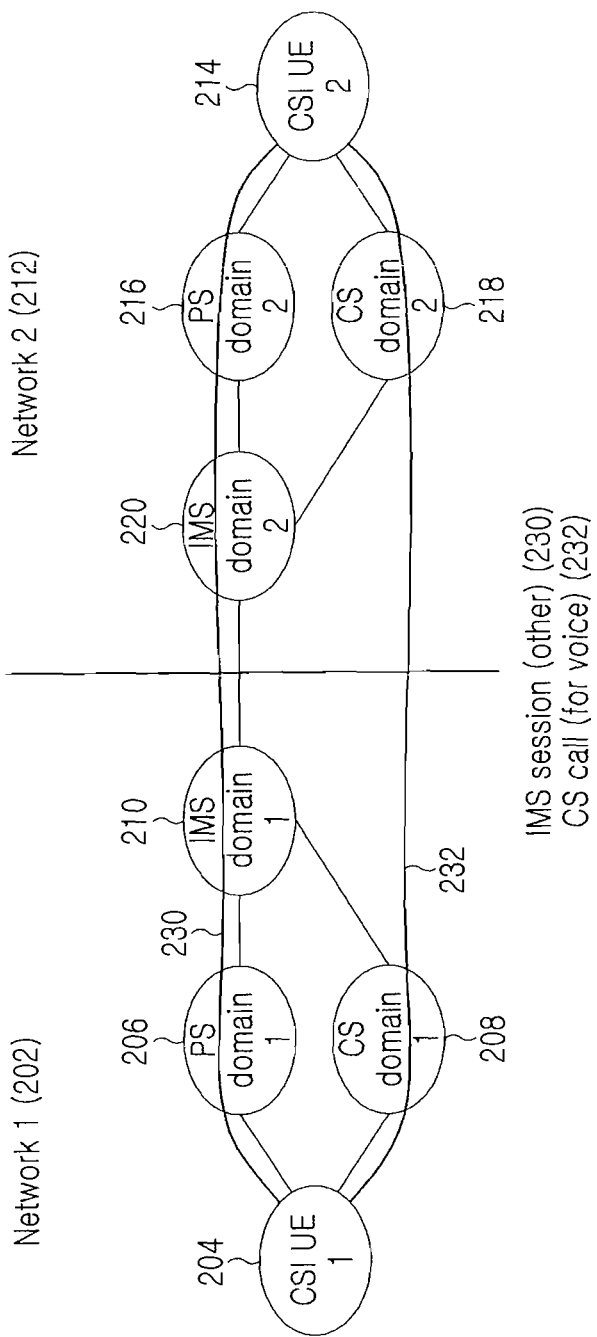
FIG. 2 is a diagram illustrating connection architecture for control signaling between CSI UEs according to the typical CSI service.

Referring to FIG. 3, a control signal 334 for a voice call between the two UEs 304 and 316, is delivered via the CS domain#1 308 and the IMS domain#1 310 in the network#1 302, and control signals 330 and 332 for a multimedia service other than the voice call, are delivered via the PS domain#1 306, the IMS domain#1 310 and the IMS domain#2 320. Although the control signals 330 and 332 of the CSI UE 304 separately flow via the PS domain#1 306 and the CS domain#1 308 in a manner similar to that of FIG. 2, because the control signal of the IMS LTE 316 uses a combined IMS session, control signals for the voice service and the other multimedia service are delivered through one SIP message.

When the CSI LTE 304 originates a call for a voice call or a combined service to the IMS UE 316, there is no problem. That is, when the CSI UE 304 originates a voice call, it uses a CS call, and the CS call is interpreted into an IMS session by the IMS domain#2 320 of the network#2 314 in the existing CS/IMS interworking method. In addition, when the CSI UE 304 originates a call for the combined service, the CSI UE 304 originates an IMS session with the CS call, and they are independently delivered to the IMS UE 316.

However, when the IMS UE 316 originates a call, problems may occur in connection of control signals. That is, if the IMS UE 316 transmits an SIP message for a voice call toward the CSI UE 304, the SIP message is delivered to the IMS domain#1 310 where the CSI UE 304 is registered. According to the conventional technology, the SIP message is delivered to the CSI UE 304 via the PS domain#1 306 to start setup of an IMS session-based voice call, i.e. Voice over Internet Protocol (VoIP) call. Therefore, the CSI UE 304 uses a VoIP-based PS call instead of using the CS call for the voice call. In this case, when the PS call cannot normally support a real-time service, the call quality deteriorates. The same problem occurs even when the IMS UE 316 sends an SIP message for originating the combined service to the CSI UE 304.

An exemplary embodiment of the present invention proposes an operation of a control entity 312 in the IMS domain#1 310, for solving the above problems. In the exemplary embodiment, the control entity 312 can be an S-CSCF (first exemplary embodiment) or an AS supporting CSI service (hereinafter referred to as "CSI AS"; second exemplary embodiment), but is not limited thereto.

Figure 4A:
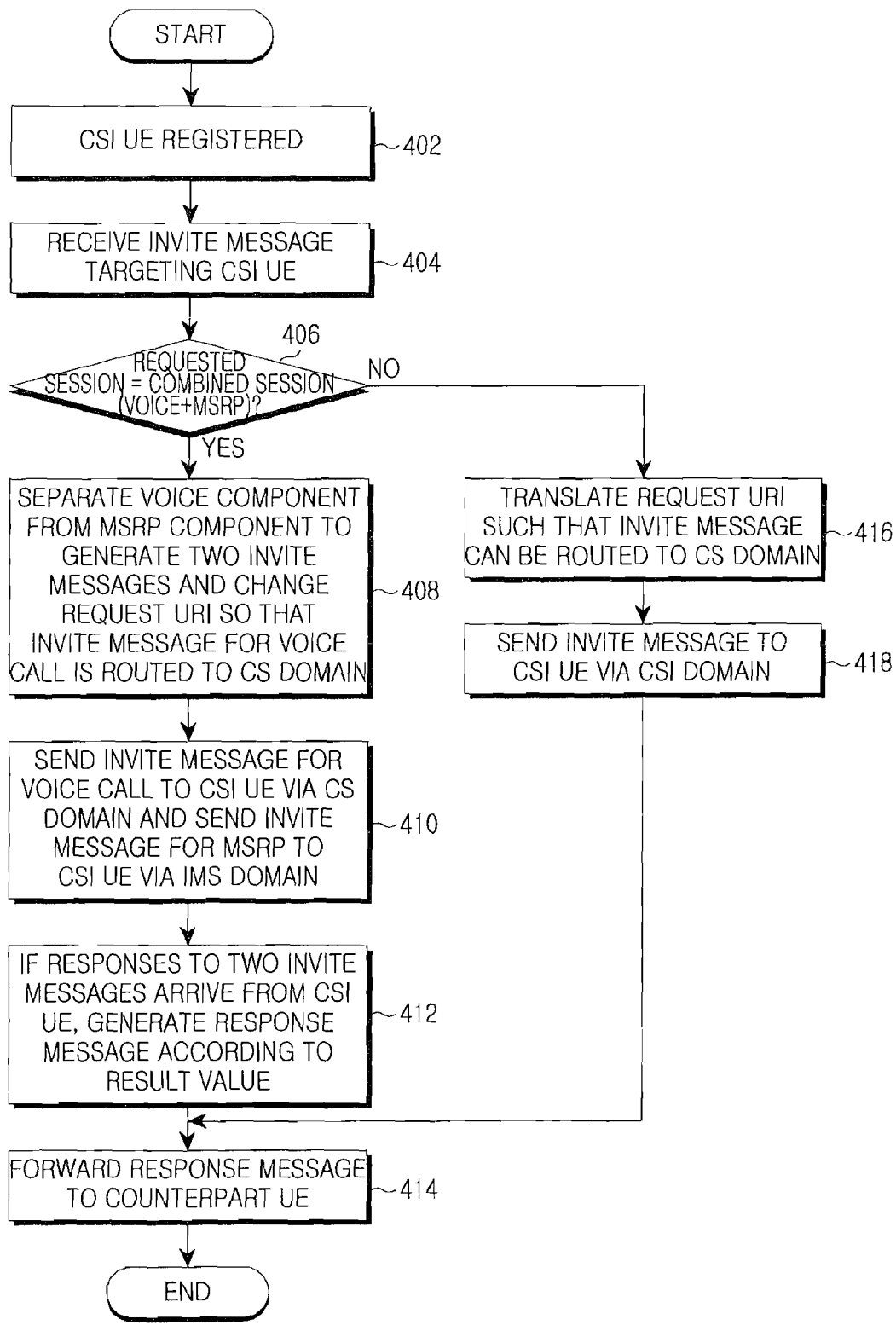
FIGS. 4A and 4B are flowcharts illustrating an operation of a control entity for managing control signals between an IMS UE and a CSI UE in an IMS domain according to an exemplary embodiment of the present invention.
Figure 4B:
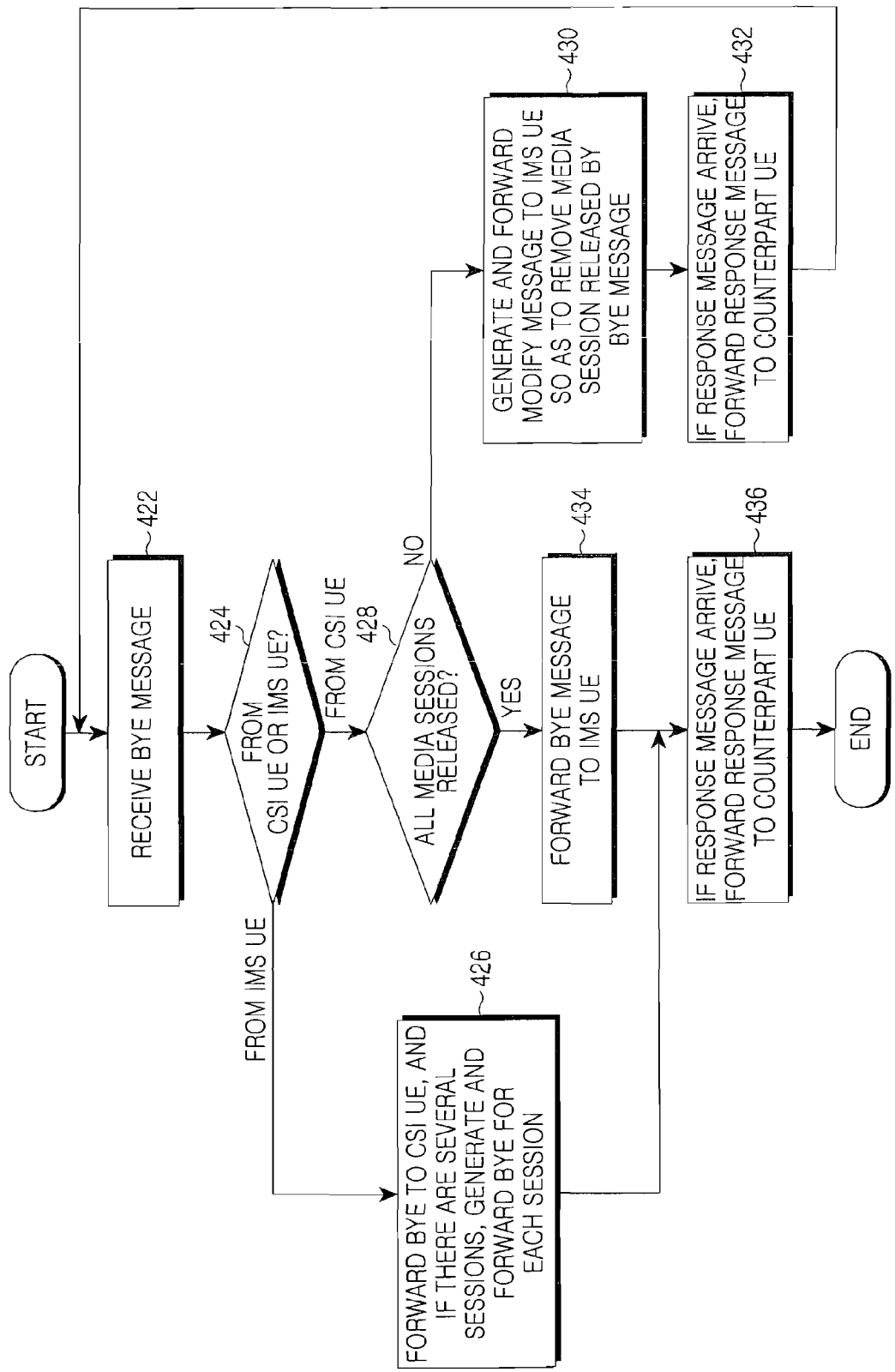

FIGS. 4A and 4B are flowcharts illustrating an operation of a control entity for managing control signals between an IMS UE and a CSI UE in an IMS domain according to an exemplary embodiment of the present invention. As described above, the control entity can be a CSI AS or an S-CSCF. Specifically, FIG. 4A shows an operation during call setup, and FIG. 4B shows an operation during call disconnection (or call drop).

Referring to FIG. 4A, an operation during call setup will now be described. In step 402, a CSI UE is registered in a control entity to receive CSI service, before it receives an SIP message. A process in which the CSI UE is registered in the control entity will be described in detail with reference to FIGS. 5A and 8A. In step 404, the control entity receives an SIP message, especially an INVITE message targeting the CSI UE. Although not illustrated, in step 404, the control entity determines whether the INVITE message is for a service including a voice call, i.e. whether the INVITE message includes a media component for a voice call. If the INVITE message is not for the service including the voice call, i.e. if the INVITE message is only for the non-real-time PS service, the INVITE message is transmitted intact to the CSI UE without any additional procedures described below. Determining whether the voice call service is included can be omitted, because the determination is previously performed in the S-CSCF when the CSI AS is used as the control entity.

In step 406, the control entity determines whether a session requested by the INVITE message is a voice session or a combined IMS session, i.e. a combined session of the voice call session and the other multimedia session. Herein, a Message Session Relay Protocol (MSRP) session is shown as an example of the other multimedia session. MSRP is a message transmission scheme proposed by IETF to solve the problem wherein an instant messaging transmission method using an SIP Message scheme never considers the relationship between SIP Message messages. Exemplary embodiments of the present invention use the MSRP as an example of the non-real-time multimedia service using IMS. When only the voice session is requested, the control entity handles, in step 416, the INVITE message such that it can be routed to the CS domain. A process of handling the INVITE message for routing to the CS domain will be described in greater detail below.

In an exemplary implementation of an embodiment of the present invention, the handling of the INVITE message can be roughly divided into two cases: one case in which a phone number for CS service allocated to the CSI UE (hereinafter referred to as a CS phone number or Mobile Station ISDN (Integrated Services Digital Network) (CS_MSISDN)) and a phone number for IMS service (hereinafter referred to as an IMS phone number or IMS_MSISDN) are different from each other, and another case in which they are equal to each other.

In the former case where the two phone numbers are different from each other, the control entity translates a destination address of the INVITE message into a Tel Universal Resource Identifier (Tel URI) form indicating a CS phone number, or an SIP URI form having a parameter user=phone (hereinafter referred to as "SIP URI user=phone") before transmission. Then, the INVITE message having the translated destination address in the Tel URI or SIP URI user=phone form, is delivered to the CS domain according to an IMS routing rule.

In the latter case where the two phone numbers are equal to each other, the control entity changes a destination address of the INVITE message from an SIP URI in the E-mail address form to an SIP URI in the Tel URI or SIP URI user=phone form. In the conventional technology, if the SIP message having the changed destination address in the Tel URI or SIP URI user=phone form arrives at an S-CSCF, the S-CSCF changes the destination address to the SIP URI form obtained through an E-mail and Telephone Numbering Mapping (ENUM) query, and delivers the SIP message having the changed destination address to the IMS domain.

In order to prevent this and deliver the SIP message to the CS domain, an exemplary embodiment of the present invention adds the information indicating delivery to the CS domain to the destination address in the Tel URI or SIP URI user=phone form of the SIP message, adds a 'Route' header indicating delivery to the CS domain to the destination address, or applies, to the SIP message, an initial Filter Criteria (iFC) set such that the SIP message having a destination address in the Tel URI or SIP URI user=phone form is always delivered to the CS domain. Alternatively, the CSI AS may directly deliver the SIP message to the CS domain via an MGCF/MGW without passing through the S-CSCF. Herein, the initial filter criteria, included in user subscription information, refers to service profile information designating a scheme for handing messages received at the S-CSCF and a scheme for parsing parameters (for example, destination address) included in the message to determine the next/final node to which the message is to be delivered.

The control entity transmits the handled INVITE message to the CSI UE via the CS domain in step 418, and delivers a response message from the CSI UE to the counterpart IMS UE in step 414.

If it is determined in step 406 that a combined IMS session is requested, the control entity separates, in step 408, Session Description Protocol (SDP) information included in the received INVITE message into a voice call-related component and an MSRP-related component, and generates two INVITE messages each including an associated one of the components. The INVITE message including the voice call-related component (hereinafter referred to as an "INVITE message for voice call") is generated in the method described in step 416 such that routing to the CS domain is possible. That is, the destination address included in the original INVITE message is translated into the Tel URI or SIP URI form and then inserted into the INVITE message for voice call. In step 410, the control entity sends the INVITE message for voice call to the CSI UE via the CS domain, and sends an INVITE message including the MSRP-related component (hereinafter referred to as an "INVITE message for MSRP") to the CSI UE via the IMS domain. In step 412, if responses to the two INVITE messages arrive from the CSI UE, the control entity generates a response message to the INVITE message that the IMS UE sent, by combining the received responses, and delivers the response message to the IMS UE in step 414.

Referring to FIG. 4B, an operation during call disconnection will be described. Upon receipt of a BYE message for call drop in step 422, the control entity determines in step 424 whether an originator of the BYE message is a CSI UE or an IMS UE. If it is determined that the IMS UE has sent the BYE message, the control entity delivers the BYE message to the counterpart CSI UE in step 426. In this case, if there are several sessions associated with the BYE message, i.e. if a session existing between the IMS UE and the CSI UE is a combined session described above, BYE messages are transmitted to the CSI UE for the respective sessions. Upon arrival of responses to the BYE messages from the CSI UE, the control entity delivers, in step 436, a response message to the counterpart IMS UE in response to the BYE message received in step 422, ending the call.

If it is determined that the CSI UE has sent the BYE message, the control entity determines in step 428 whether all CSI sessions existing between the CSI UE and the IMS UE should be ended in reply to the BYE message. If there is still any session left, the control entity sends a MODIFY message instead of the BYE message to the IMS LTE in step 430. The MODIFY message includes an SDP parameter instructing the UE to remove only the media-related component requested by the received BYE message from the combined session. Upon receipt of a response message for the MODIFY message, the control entity sends, in step 432, a response message to the CSI UE in response to the BYE message received in step 422. If it is determined that all CSI sessions should be ended in reply to the BYE message that the CSI UE has sent, the control entity delivers a BYE message to the IMS UE in step 434. In step 436, upon arrival of a response to the BYE message from the IMS UE, the control entity delivers a response message to the CSI UE in response to the BYE message received in step 422, dropping the call.

With reference to the accompanying drawings, a description will now be made of a call procedure between an IMS UE and a CSI UE according to an exemplary embodiment of the present invention. FIGS. 5 to 10 will show only the parts related to certain features of exemplary embodiments of the present invention among the entities related to the IMS call setup process. For example, a description of known entities of the IMS domain, such as Proxy (P)-CSCF, Interrogating (I)-CSCF, BGCF, MGCF and SGW; known entities of the CS domain, such as MGW and MSC; and known procedures such as media negotiation, will be omitted.

First Exemplary Embodiment

Figure 5A:
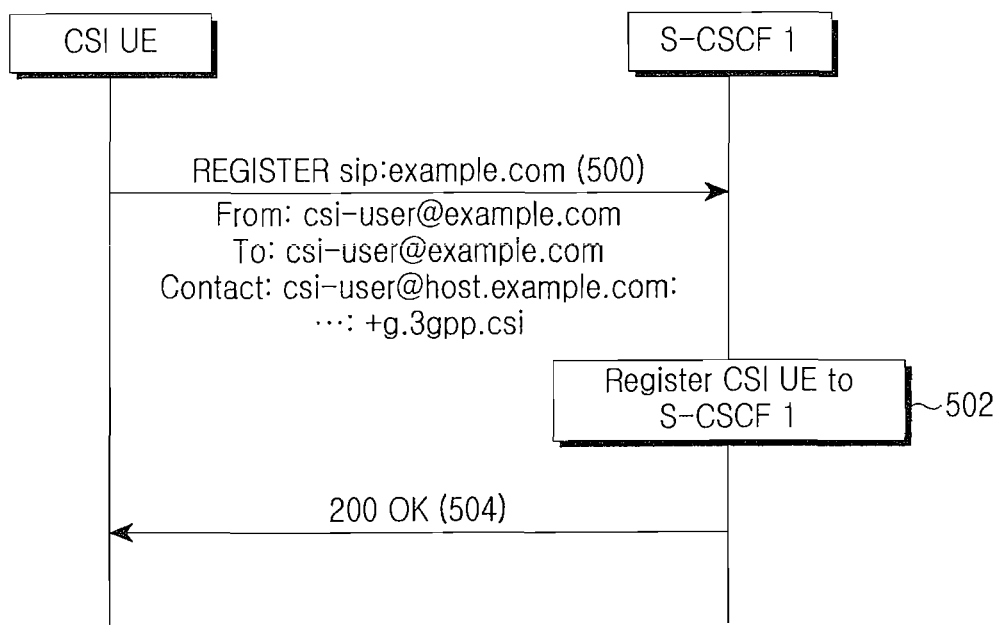
FIG. 5A is a diagram illustrating a control signal flow for registering a CSI UE in an S-CSCF when the S-CSCF serves as a control entity according to a first exemplary embodiment of the present invention.

FIG. 5A is a diagram illustrating a control signal flow for registering a CSI UE in an S-CSCF when the S-CSCF serves as a control entity according to a first exemplary embodiment of the present invention.

Referring to FIG. 5A, in step 500, the CSI UE sends a REGISTER message to the S-CSCF1 to register itself in the S-CSCF1. This registration should not happen when a Subscriber Identity Module (SIM)/User Services Identity Module (USIM) card of the user is inserted in a UE not supporting CSI service. In order to detect this situation, the CSI UE sends capability information indicating support of the CSI service, to the control entity, i.e. the S-CSCF1. That is, the REGISTER message includes an indicator indicating the capability information of the CSI UE. As an example of the indicator, '+g.3gpp.csi' is included in a Contact header of the REGISTER message as "feature tag."

Based on the "feature tag," the S-CSCF1 recognizes that the UE that sent the REGISTER message supports the CSI service, and registers the CSI UE in step 502 so that it can support the CSI service. In step 504, the S-CSCF1 sends a 200 OK message to the CSI UE to indicate completion of the registration.

Figure 5B:
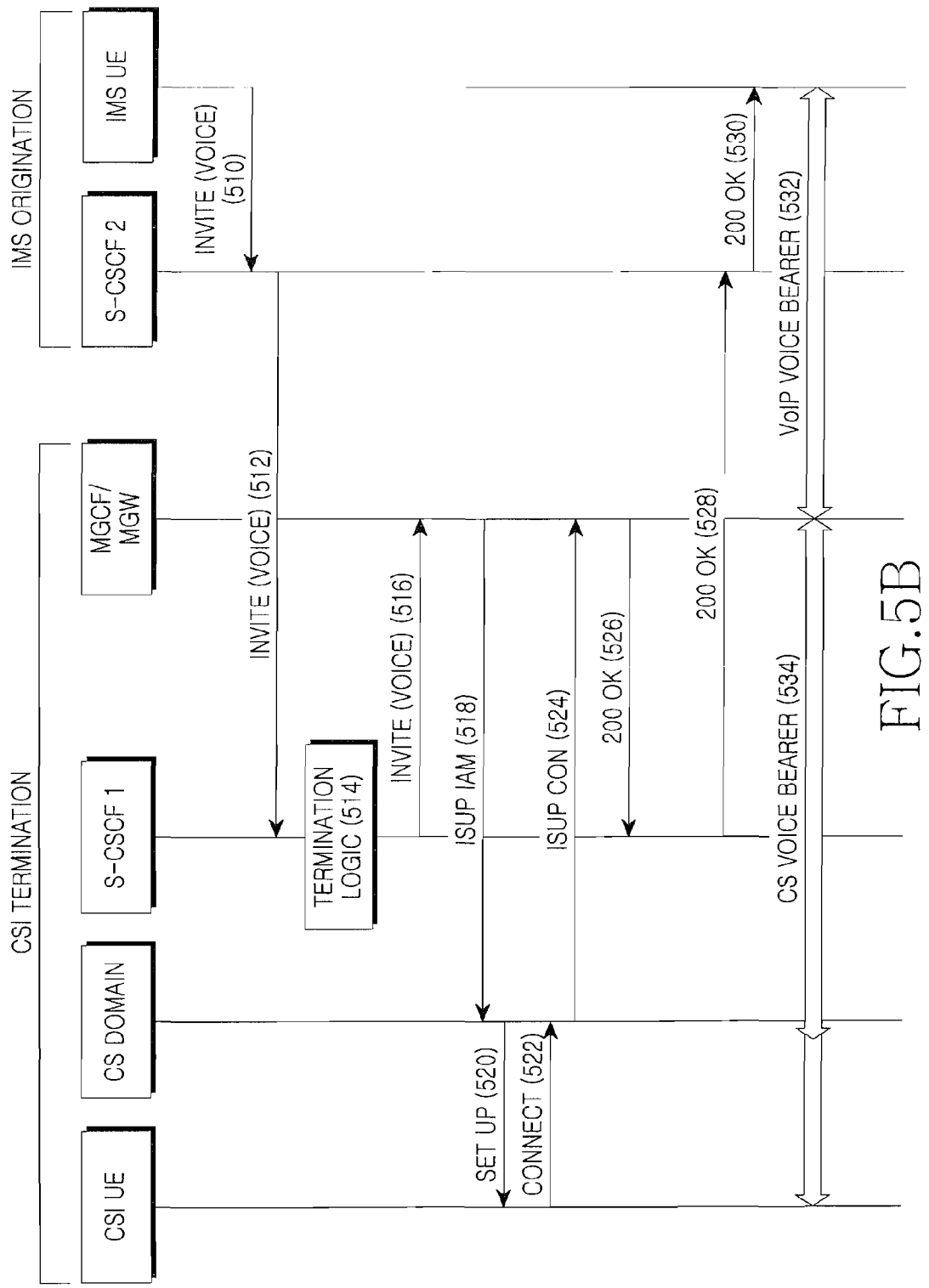
FIG. 5B is a diagram illustrating a control signal flow for sending an INVITE message by an IMS UE to originate a voice call when an S-CSCF serves as a control entity according the first exemplary embodiment of the present invention.

FIG. 5B is a diagram illustrating a control signal flow between IMS Origination and CSI Termination, for sending an INVITE message by an IMS UE to originate a voice call when an S-CSCF serves as a control entity according the first exemplary embodiment of the present invention.

Referring to FIG. 5B, in step 510, an IMS UE sends an INVITE message for requesting a voice session for a voice call with a CSI UE, to an S-CSCF2 managing the IMS UE. In step 512, the S-CSCF2 forwards the INVITE message to an S-CSCF1 managing the CSI UE. In step 514, the S-CSCF1 determines that a voice session-related component is included in the INVITE message, and handles the received INVITE message according to the previously included termination logic such that it should be routed to the CS domain. The termination logic, included in the S-CSCF1, determines whether the received INVITE message includes only the voice-related component or includes both the voice-related component and an MSRP-related component. After delivering the INVITE message, the termination logic determines at least one node, and changes a destination address of the INVITE message, if necessary. In step 516, the INVITE message with the changed destination address is sent to an MGCF/MGW. In step 518, the MGCF/MGW translates the SIP-based INVITE message into a CS signaling protocol-based ISDN User's Part (ISUP) Initial Address Message (IAM), and delivers the ISUP IAM to a CS domain.

In step 520, the CS domain sends a System Signaling No.7 (SS7) protocol-based SETUP message to a CSI UE via a RAN in response to the ISUP IAM so that the CSI UE can set up a radio bearer for a call with the IMS UE. In step 522, the CSI UE sets up a radio bearer in response to the SETUP message, and then sends a CONNECT message to the CS domain. In step 524, the CS domain delivers an ISUP CON message indicating connection with the CSI UE to the MGCF/MGW in response to the CONNECT message. In step 526, the MGCF/MGW translates the ISUP CON message into a 200 OK message, which is an SIP-based response message, and sends the 200 OK message to the S-CSCF1. In steps 528 and 530, the 200 OK message is forwarded to the IMS UE via the S-CSCF1 and the S-CSCF2. After the IMS UE receives the 200 OK message, a VoIP voice bearer is set up between the IMS UE and the MGCF/MGW in step 532, and a CS voice bearer is opened between the CSI UE and the MGCF/MGW via the CS domain in step 534. As a result, the IMS UE performs a voice call with the CSI UE via the VoIP voice bearer and the CS voice bearer. Conversion between the voice packet of the VoIP voice bearer and the voice data of the CS voice bearer is achieved by the MGW.

FIG. 6 is a diagram illustrating a control signal flow between IMS Origination and CSI Termination, for originating a combined service of voice and MSRP by an IMS UE when an S-CSCF serves as a control entity according to the first exemplary embodiment of the present invention.

Referring to FIG. 6, in step 601, an IMS UE sends an INVITE message for requesting a combined service including voice and MSRP for communication with a CSI UE, to an S-CSCF2 managing the IMS UE. In step 602, the INVITE message is forwarded to an S-CSCF1 managing the CSI UE via the S-CSCF2. In step 603, the S-CSCF1 determines that the received INVITE message requests both the voice and the MSRP, and if the S-CSCF1 recognizes from capability information of the CSI UE that the CSI UE targeted by the INVITE message can support CSI service, it separates a voice call-related component included in the INVITE message from an MSRP-related component, and generates two INVITE messages each including an associated one of the components.

In step 603a, the S-CSCF1 handles the INVITE message for voice call using a termination logic previously included therein, such that it can be routed to a CS domain. In step 604, the INVITE message for voice call is sent to an MGCF/MGW. In step 605, the MGCF/MGW translates the SIP-based INVITE message into a CS signaling protocol-based ISUP IAM and delivers the ISUP IAM to the CS domain. In step 606, the CS domain sends an SS7-based SETUP message to the CSI UE via a RAN in response to the ISUP IAM, such that the CSI UE can set up a radio bearer for a call with the IMS UE. In step 608, the CSI UE sets up a radio bearer in response to the SETUP message, and sends a CONNECT message to the CS domain. In step 609, the CS domain delivers an ISUP CON message indicating connection with the CSI UE to the MGCF/MGW in response to the CONNECT message. In step 610, the MGCF/MGW translates the ISUP CON message into an SIP-based 200 OK message, and delivers the 200 OK message to the S-CSCF1.

In step 607, the S-CSCF1 delivers the INVITE message including the MSRP-related component to the CSI UE via the RAN and a PS domain to which the CSI UE belongs. In step 611, the CSI UE opens a session for the MSRP and then sends a 200 OK message to the S-CSCF1 in response to the INVITE message for MSRP.

In an exemplary implementation, steps 603a~606, and 608~610, in which the INVITE message including the voice-related component is delivered to the CSI UE and the S-CSCF1 receives a response thereto, and steps 607 and 611 in which the INVITE message including the MSRP-related component is delivered to the CSI UE and the S-CSCF1 receives a response thereto, are performed independently, for example, in parallel.

After receiving 200 OK messages for the two INVITE messages, the S-CSCF1 generates a combined 200 OK message by combining the 200 OK messages in step 612, and delivers the combined 200 OK message to the IMS UE via the S-CSCF2 in steps 613 and 614. Upon receipt of the 200 OK messages for voice and MSRP, the IMS UE sets up a VoIP voice bearer between the IMS UE and the MGCF/MGW in step 616, and a CS voice bearer is opened between the CSI UE and the MGCF/MGW in step 618. In addition, a user bearer for MSRP is opened between the CSI UE and the IMS UE in step 620. Therefore, the IMS UE performs a voice call with the CSI UE through the VoIP voice bearer and the CS voice bearer, and at the same time, exchanges packets with the CSI UE through the user bearer.

Second Exemplary Embodiment

Figure 7:
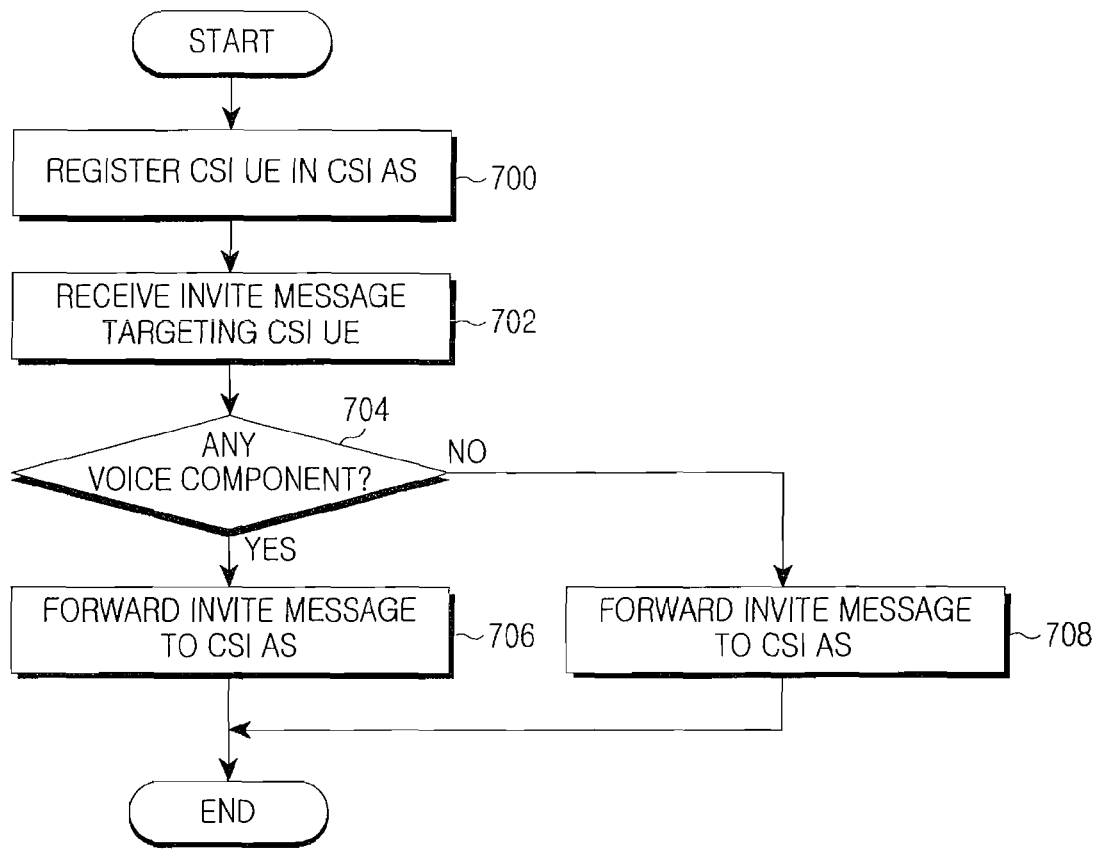
FIG. 7 is a flowchart illustrating an operation of an S-CSCF performed when a CSI AS serves as a control entity according to a second exemplary embodiment of the present invention.

FIG. 7 is a flow chart illustrating an operation of an S-CSCF performed when a CSI AS serves as a control entity according to a second embodiment of the present invention.

Referring to FIG. 7, in step 700, an S-CSCF registers a CSI UE in the CSI AS. The S-CSCF receives an INVITE message targeting the CSI UE in step 702, and determines in step 704 whether the INVITE message includes a component used for requesting a voice call, i.e. a voice call-related component, and whether the INVITE message includes a component related to the service that should necessarily be processed in the IMS domain together with PoC service. If the INVITE message has a voice call-related component and there is no problem in providing the full service required by the INVITE message, even though the voice call-related component is delivered to a CS domain, the S-CSCF delivers the INVITE message to the CSI AS in step 706. Otherwise, the S-CSCF delivers the INVITE message to the CSI UE in step 708.

Figure 8A:
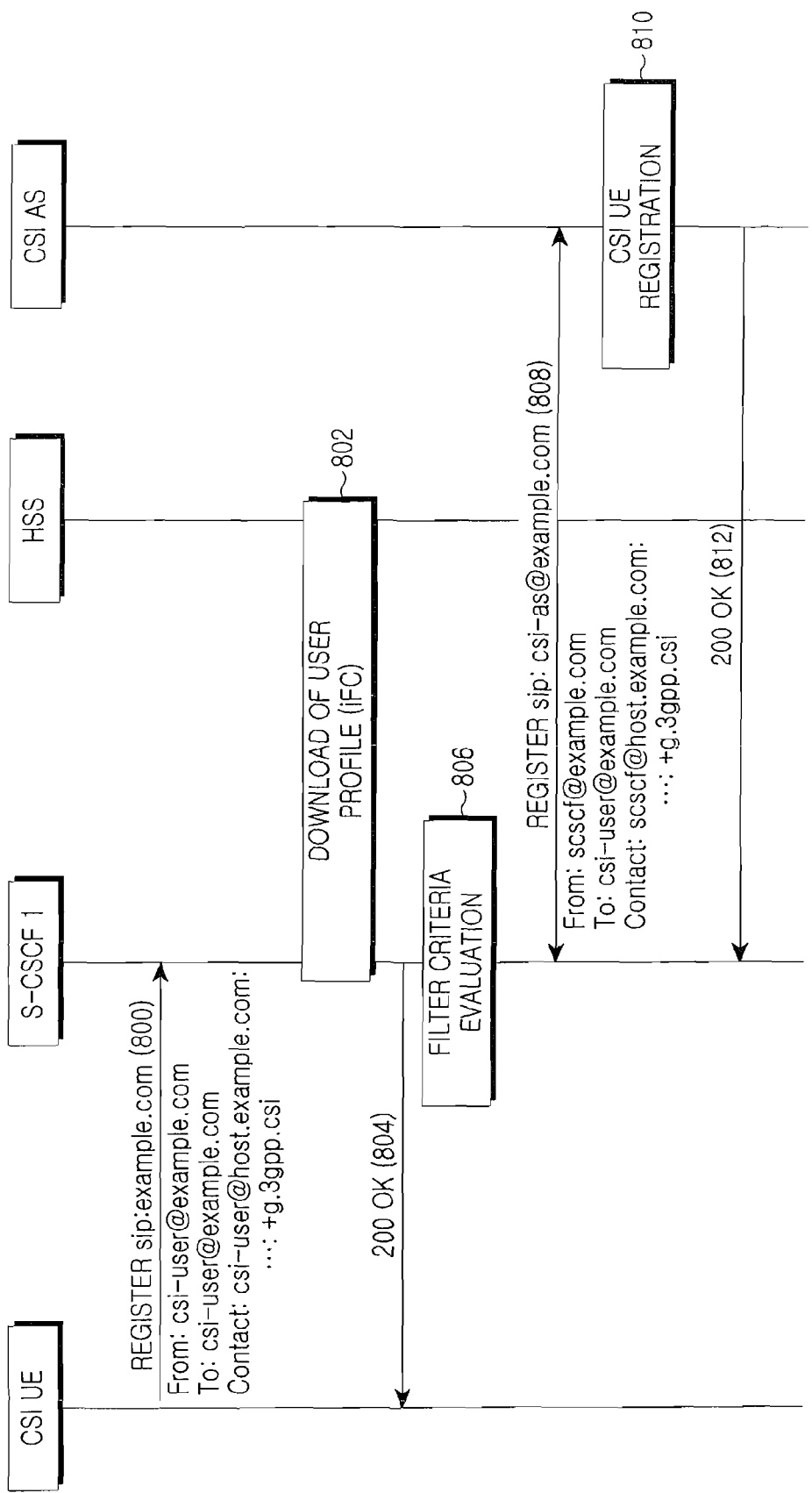
FIG. 8A is a diagram illustrating a control signal flow for registering a CSI UE in a CSI AS when the CSI AS serves as a control entity according to the second exemplary embodiment of the present invention.

FIG. 8A is a diagram illustrating a control signal flow for registering a CSI UE in a CSI AS when the CSI AS serves as a control entity according to the second embodiment of the present invention.

Referring to FIG. 8A, in step 800, a CSI UE includes '+g.3gpp.csi' indicating capability information of the CSI UE in a REGISTER message as "feature tag," and sends the REGISTER message to an S-CSCF1. In step 802, the S-CSCF1 downloads a user profile (including iFC) for the CSI UE from a Home Subscriber Server (HSS) storing subscriber information for the CSI UE. The HSS is a main data storage for storing subscriber information of all subscribers and IMS service-related data. In an exemplary embodiment of the present invention, the initial filter criteria is applied for allowing an SIP request for the CSI UE and an IMS registration request from the CSI UE to be delivered to a CSI AS in an IMS domain.

In step 804, the S-CSCF1 sends a 200 OK message, a response indicating success in registration, to the CSI UE. The S-CSCF1 evaluates the downloaded user profile in step 806, and then sends the REGISTER message from the SCI UE to the CSI AS to register the CSI UE in the CSI AS in step 808. In step 810, the CSI AS registers the CSI UE, recognizing that the UE that sent the REGISTER message is the CSI UE. In step 812, the CSI AS sends a response message indicating the success in registration of the CSI UE to the S-CSCF1. The stored iFC is used for determining whether to deliver the SIP message targeting the CSI UE, arrived at the S-CSCF1, to the CSI AS.

Figure 8B:
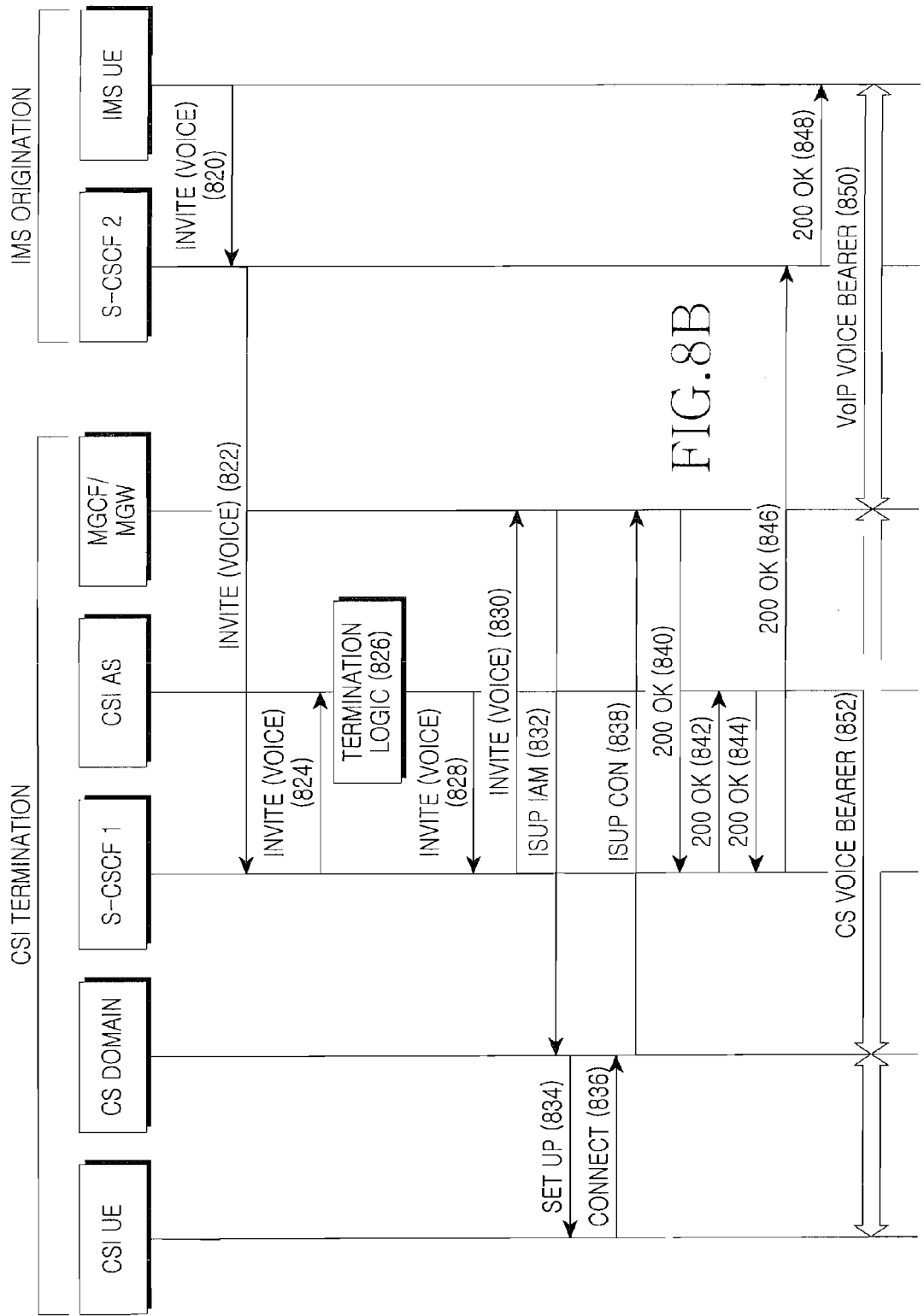
FIG. 8B is a diagram illustrating a control signal flow for sending an INVITE message by an IMS UE to originate a voice call when a CSI AS serves as a control entity according to the second exemplary embodiment of the present invention.

FIG. 8B is a diagram illustrating a control signal flow between IMS Origination and CSI Termination, for sending an INVITE message by an IMS UE to originate a voice call when a CSI AS serves as a control entity according to the second embodiment of the present invention. Herein, a CS domain, an S-CSCF1, a CSI AS and an MGCF/MGW, managing a CSI UE, comprise a network#1, i.e. Public Land Mobile Network#1 (PLMN#1), and an S-CSCF2 managing an IMS UE comprise a network#2, i.e. PLMN#2. Of the entities, the S-CSCF1, the CSI AS, and the MGCF/MGW belong to an IMS core network#1, and the S-CSCF2 belongs to an IMS core network#2.

Referring to FIG. 8B, in step 820, the IMS UE sends an INVITE message including a voice call-related component to the S-CSCF2 managing the IMS UE to request a voice call with the CSI UE. In step 822, the INVITE message is forwarded from the S-CSCF2 to the S-CSCF1. In step 824, the S-CSCF1 forwards the INVITE message to the CSI AS in which the CSI UE is registered, determining that the INVITE message has the voice call-related component for requesting a voice call. In step 826, the CSI AS handles the received INVITE message using a termination logic previously included therein, such that the received INVITE message should be routed to the CS domain as described above. In steps 828 and 830, the INVITE message is forwarded to the MGCF/MGW via the S-CSCF1. In step 832, the MGCF/MGW translates the SIP-based INVITE message into an ISUP IMA message, and delivers the ISUP IAM message to the CS domain. Although not illustrated, the CSI AS may directly forward the INVITE message to the MGCF/MGW without passing through the S-CSCF1 in steps 828 and 830.

In step 834, the CS domain sends an SS7-based SETUP message to the CSI UE via a RAN in response to the ISUP IAM so that the CSI UE can set up a radio bearer for a call with the IMS UE. In step 836, the CSI UE sets up a radio bearer and sends a CONNECT message in response to the SETUP message. In step 838, the CS domain delivers an ISUP CON message indicating connection with the CSI UE to the MGCF/MGW in response to the CONNECT message. In step 840, the MGCF/MGW translates the ISUP CON message into an SIP-based 200 OK message and sends the 200 OK message to the S-CSCF1. When the INVITE message has not passed through the S-CSCF1 in steps 828 and 830 as described above, the 200 OK message is also directly forwarded from the MGCF/MGW to the CSI AS in steps 840 and 842.

In steps 842 and 844, the 200 OK message is sent back to the S-CSCF1 via the CSI AS. In steps 846 and 848, the S-CSCF1 forwards the 200 OK message to the IMS UE via the S-CSCF2. After the IMS UE receives the 200 OK message, a VoIP voice bearer is set up between the IMS UE and the MGCF/MGW in step 850, and a CS voice bearer is set up between the CSI UE and the MGCF/MGW in step 852. The IMS UE performs a voice call with the CSI UE through the VoIP voice bearer and the CS voice bearer.

Figure 9:
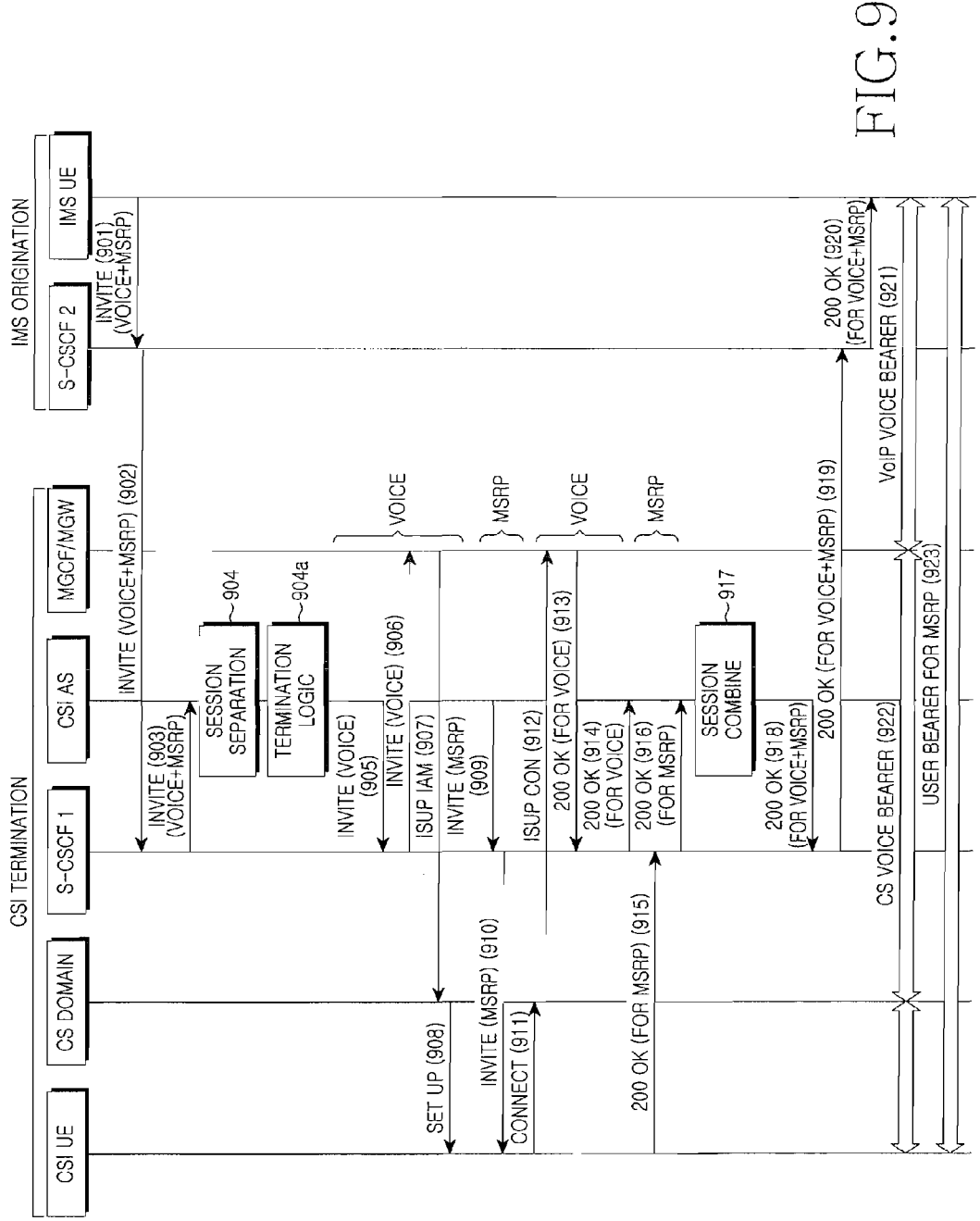
FIG. 9 is a diagram illustrating a control signal flow for originating a combined service of voice and MSRP by an IMS UE when a CSI AS serves as a control entity according to the second exemplary embodiment of the present invention.

FIG. 9 is a diagram illustrating a control signal flow between IMS Origination and CSI Termination, for originating a combined service of voice and MSRP by an IMS UE when a CSI AS serves as a control entity according to the second exemplary embodiment of the present invention.

Referring to FIG. 9, in step 901, an IMS UE sends an INVITE message including both a voice call-related component and an MSRP-related component to an S-CSCF2 managing the IMS UE, for communication with a CSI UE. In step 902, the INVITE message is forwarded from the S-CSCF2 to an S-CSCF1 managing the CSI UE. In step 903, the S-CSCF1 forwards the INVITE message to a CSI AS, determining that the INVITE message includes both the voice call-related component and the MSRP-related component. In step 904, the CSI AS, recognizing that the voice call-related component is included in the INVITE message, separates the voice call-related component of the INVITE message from the MSRP-related component, and generates two INVITE messages each including an associated one of the components.

In step 904a, the CSI AS handles the INVITE message including the voice call-related component using a termination logic previously included therein, such that it should be routed to a CS domain. In steps 905 and 906, the INVITE message for voice call is sent to the MGCF/MGW via the S-CSCF1. In step 907, the MGCF/MGW translates the SIP-base INVITE message into an ISUP AIM, and delivers the ISUP AIM to the CS domain. Although not illustrated, the CSI AS may directly forward the INVITE message for voice call to the MGCF/MGW without passing through the S-CSCF1 in steps 905 and 906.

In step 908, the CS domain sends an SS7-based SETUP message to the CSI UE via a RAN in response to the ISUP IAM. In step 911, the CSI UE sets up a radio bearer for a call with the IMS UE and sends a CONNECT message in response to the SETUP message. In step 912, the CS domain sends an ISUP CON message indicating connection with the CSI UE to the MGCF/MGW in response to the CONNECT message. In step 913, the MGCF/MGW translates the ISUP CON message into an SIP-based 200 OK message, and sends the 200 OK message to the S-CSCF1. In step 914, the 200 OK message is forwarded to the CSI AS as a response to the INVITE message including the voice call-related component. When the INVITE message has not passed through the S-CSCF1 in steps 905 and 906 as described above, the 200 OK message is also directly forwarded from the MGCF/MGW to the CSI AS in steps 913 and 914.

The INVITE message including the MSRP-related component generated in step 904 is delivered to the S-CSCF1 in step 909. In step 910, the S-CSCF1 forwards the INVITE message including the MSRP-related component to the CSI UE via the RAN and a PS domain to which the CSI UE belongs. In step 915, the CSI UE opens a session for the MSRP and sends a 200 OK message to the S-CSCF1 in response to the INVITE message. In step 916, the 200 OK message is forwarded to the CSI AS.

In an exemplary implementation, steps 905~908, and 911~914, in which the INVITE message including the voice call-related component is delivered to the CSI UE and the CSI AS receives a response thereto, and steps 909~910, and 915~916, in which the INVITE message including the MSRP-related component is delivered to the CSI UE and the CSI AS receives a response thereto, are performed independently.

The SCI AS generates a combined 200 OK message by combining the 200 OK messages in step 917, and sends the combined 200 OK message to the S-CSCF1 in step 918. In steps 919 and 920, the combined 200 OK message is forwarded to the IMS UE via the S-CSCF2. After the IMS UE receives the 200 OK message for voice and MSRP, a VoIP voice bearer is set up between the IMS UE and the MGCF/MGW in step 921, and a CS voice bearer is opened between the CSI UE and the MGCF/MGW in step 922. In addition, a user bearer for MSRP is opened between the CSI UE and the IMS UE in step 923. Therefore, the IMS UE performs a voice call with the CSI UE through the VoIP voice bearer and the CS voice bearer, and at the same time, exchanges packets with the CSI UE through the user bearer.

Figure 10:
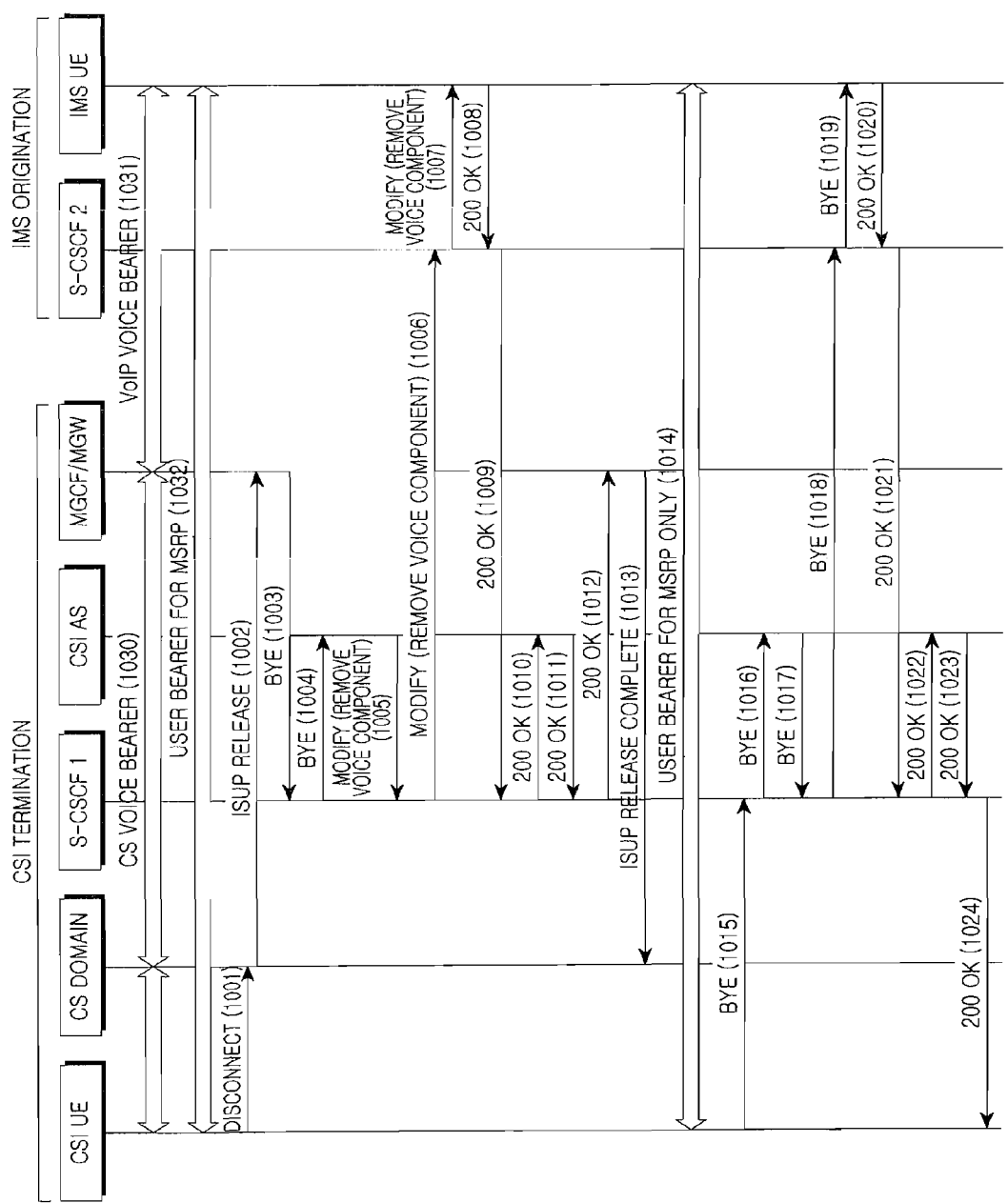
FIG. 10 is a diagram illustrating an operation in which a CSI UE using a combined service releases a voice service and the other multimedia service in sequence according to an exemplary embodiment of the present invention.

FIG. 10 is a diagram illustrating an operation between IMS Origination and CSI Termination, in which a CSI UE using a combined service releases a voice service and other multimedia service (for example, MSRP) in sequence according to an exemplary embodiment of the present invention.

Referring to FIG. 10, an IMS UE is performing a voice call with a CSI UE via a VoIP voice bearer 1031 and a CS voice bearer 1030, and at the same time, exchanging packets with the CSI UE through a user bearer 1032. During the call, the CSI UE sends, in step 1001, an SS7-based DISCONNECT message to a CS domain via a RAN to disconnect the voice call, and releases the CS voice bearer 1030. In step 1002, the CS domain sends an ISUP RELEASE message to an MGCF/MGW in response to the DISCONNECT message. In step 1003, the MGCF/MGW sends an SIP-based BYE message to an S-CSCF1 managing the CSI UE in response to the ISUP RELEASE message. In step 1004, the S-CSCF1 forwards the BYE message to a CSI AS. In step 1005, the CSI AS generates a MODIFY message and sends the MODIFY message to the S-CSCF1 to release the related voice session. In step 1006, the S-CSCF1 forwards the received MODIFY message to an S-CSCF2 managing the IMS UE. In step 1007, the MODIFY message is forwarded from the S-CSCF2 to the IMS UE. In steps 1005, 1006 and 1007, an INVITE message or an UPDATE message can be used instead of the MODIFY message. The INVITE or UPDATE message performs the same function as that of the MODIFY message shown in steps 1005, 1006 and 1007.

In step 1008, the IMS UE releases the VoIP voice bearer 1031 and then sends a 200 OK message to the S-CSCF2 in response to the MODIFY message. In step 1009, the S-CSCF2 forwards the 200 OK message to the S-CSCF1. In step 1010, the S-CSCF1 forwards the 200 OK message to the CSI AS. In step 1011, the CSI AS sends a 200 OK message to the S-CSCF1 in response to the BYE message sent in step 1004. In step 1012, the S-CSCF1 sends a 200 OK message to the MGCF/MGW in response to the BYE message sent in step 1003. In step 1013, the MGCF/MGW sends an ISUP RELEASE COMPLETE message indicating the release of the voice bearers 1030 and 1031 to the CS domain. As a result, the voice bearers 1030 and 1031 for a voice call are released, and only the user bearer 1032 for multimedia service remains in step 1014.

In step 1015, the CSI UE sends a BYE message to the S-CSCF1 to release the MSRP-based multimedia service. In step 1016, the S-CSCF1 forwards the BYE message to the CSI AS. In steps 1017 and 1018, the CSI AS forwards the BYE message back to the S-CSCF2 via the S-CSCF1. In step 1019, the S-CSCF2 forwards the BYE message back to the IMS UE. In step 1020, the IMS UE releases the user bearer 1032 and then sends a 200 OK message in response to the BYE message. In steps 1020, 1021 and 1022, the 200 OK message is forwarded to the CSI AS via the S-CSCF1 and the S-CFCF2. In step 1023, the CSI AS delivers a 200 OK message indicating that the IMS UE has released the user bearer 1032 for multimedia service, to the S-CSCF1 in response to the BYE message of step 1016. In step 1024, the 200 OK message is forwarded from the S-CSCF1 to the CSI UE. As a result, the multimedia service between the CSI UE and the IMS UE is released.

As can be understood from the foregoing description, a control entity of an IMS domain separates control messages from an IMS UE and a CSI UE according to their objects, and routes each of the separated messages to corresponding network entities, thereby enabling a combined service of a voice call and a multimedia service, originated by the IMS UE, between the CSI UE and the IMS UE.

While the present invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A method for receiving a multimedia service by a first terminal in a communication system, the method comprising:
    transmitting, to a combined circuit switched call and internet protocol multimedia subsystem session (CSI) application server (AS), a first message including voice information and message information for communicating with a second terminal; and
    performing a voice call to the second terminal through a voice over IP (VoIP) voice bearer and a circuit switched (CS) voice bearer if a second message in response to the first message is received from the CSI AS,
    wherein the VoIP voice bearer is established between the first terminal and a media gateway (MGW),
    wherein the CS voice bearer is established between the second terminal and the MGW, and
    wherein the second message comprises a 200 OK message, received from the CSI AS, for the voice information and the message information.

2. The method of claim 1, wherein the first message is spilt into the voice information and the message information by the CSI AS.

3. The method of claim 1, further comprising the step of:
    performing messaging service through a user bearer between the second terminal and the first terminal.

4. The method of claim 1, wherein the 200 OK message includes a response to the voice information, received the CSI AS.

5. The method of claim 1, wherein the 200 OK message indicates that the second terminal accepts a session for the message information, received from the CSI AS.

6. The method of claim 1,
    wherein the voice information is received to the second terminal via a CS domain, and
    wherein the message information is received to the second terminal via a packet switched (PS) domain.

7. A first terminal in a communication system, the first terminal comprising:
    a transceiver configured to transmit a first message and to receive a second message; and
    a controller configured to:
        control that the transceiver sends to a combined circuit switched call and internet protocol multimedia subsystem session (CSI) application server (AS), the first message including voice information and message information for communicating with a second terminal, and
        perform a voice call to the second terminal through a voice over IP (VoIP) voice bearer and a circuit switched (CS) voice bearer if the second message in response to the first message is received from the CSI AS,
    wherein the VoIP voice bearer is established between the first terminal and a media gateway (MGW),
    wherein the CS voice bearer is established between the second terminal and the MGW, and
    wherein the second message comprises a 200 OK message, received from the CSI AS, for the voice information and the message information.

8. The first terminal of claim 7, wherein the first message is spilt into the voice information and the message information by the CSI AS.

9. The first terminal of claim 7, wherein the controller is further configured to perform messaging service through a user bearer between the second terminal and the first terminal.

10. The first terminal of claim 7, wherein the 200 OK message includes a response to the voice information, received from the CSI AS.

11. The first terminal of claim 7, wherein the 200 OK message indicates that the second terminal accepts a session for the message information, received from the CSI AS.

12. The first terminal of claim 7,
    wherein the voice information is received to the second terminal via a CS domain, and
    wherein the message information is received to the second terminal via a packet switched (PS) domain.

* * * * *